United States Patent [19]

Barmatz

[11] 4,393,706
[45] Jul. 19, 1983

[54] SYSTEM FOR CONTROLLED ACOUSTIC ROTATION OF OBJECTS

[75] Inventor: Martin B. Barmatz, Glendale, Calif.

[73] Assignee: The United States of America as represented by the Administrator of the National Aeronautics and Space Administration, Washington, D.C.

[21] Appl. No.: 303,672

[22] Filed: Sep. 18, 1981

[51] Int. Cl.³ .......................................... H02N 11/00
[52] U.S. Cl. ........................................ 73/505; 60/721
[58] Field of Search .................... 73/505; 318/116; 60/721; 310/300, 311; 308/10

[56] References Cited

U.S. PATENT DOCUMENTS

| | | | |
|---|---|---|---|
| 3,232,120 | 2/1966 | Ensley | 73/505 |
| 3,882,732 | 5/1975 | Fletcher | 73/505 |
| 4,139,806 | 2/1979 | Kanber et al. | 318/116 |

*Primary Examiner*—James J. Gill

*Attorney, Agent, or Firm*—Paul F. McCaul; John R. Manning; Thomas H. Jones

[57] ABSTRACT

A system is described for use with acoustically levitated objects, which enables close control of rotation of the object. One system includes transducers (18, 20, 22) that propagate acoustic waves along the three dimensions (X, Y, Z) of a chamber (16) of rectangular cross section. Each transducer generates a first wave which is resonant to a corresponding chamber dimension to acoustically levitate an object, and additional higher frequency resonant wavelengths for controlling rotation of the object. The three chamber dimensions and the corresponding three levitation modes (resonant wavelengths) are all different, to avoid degeneracy, or interference, of waves with one another, that could have an effect on object rotation. Only the higher frequencies, with pairs of them (e.g. 50, 52) having the same wavelength, are utilized to control rotation, so that rotation is controlled independently of levitation and about any arbitrarily chosen axis.

11 Claims, 4 Drawing Figures

SYSTEM FOR CONTROLLED ACOUSTIC ROTATION OF OBJECTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

An object can be levitated within a rectangular chamber by propagating acoustic waves that set up a standing wave pattern, so the object is held at a pressure node (location where pressure is a minimum). The object can be stably held along three dimensions by establishing three mutually perpendicular standing wave patterns, the object gravitating to a point where pressure nodes of the three patterns intersect. Where the same wavelength is propagated along two or three dimensions (with corresponding finite air particle velocity components at the object position to apply a torque to the object), the object undergoes rotation in an amount dependent upon the phase difference between the waves of the same wavelength. U.S. Pat. No. 3,882,732 by Wang et al., shows (in his FIG. 13) a chamber of square cross section with equal wavelengths along two directions, which rotates the object by controlling the relative phases of waves of the same wavelength.

While the use of a square chamber and equal wavelengths along two perpendicular directions to levitate and rotate an object, provides a simple and effective technique in some applications, its use can be limited. In high temperature environments, as where the levitated object is heated to process it, temperature gradients along the path of the acoustic waves, between the room temperature of an acoustic drive and the high temperature chamber, can produce significant phase changes in the degenerate wavelengths that results in uncontrollable rotation. Another cause of uncontrolled rotation is partial coupling of acoustic waves of the same wavelengths initially propagated in different directions, which can modify their phase relationship and lead to unanticipated object rotation. Such rotation is especially troublesome where very high sound intensities are utilized for levitation so a slight phase difference may produce a large object-rotating torque.

SUMMARY OF THE INVENTION

In accordance with one embodiment of the present invention, a system is provided for closely controlling rotation of an acoustically levitated object, which provides a high degree of object rotation control. This is accomplished basically by utilizing one set of wavelengths for levitation and a separate set for control of rotation, and by choosing the levitating wavelengths so they do not affect rotation.

In a chamber of predetermined width and length, one transducer propagates acoustic waves resonant to the width of the chamber but of two different frequencies. Another transducer propagates two different resonant acoustic waves along the length of the chamber. The chamber dimensions and the acoustic wavelengths are chosen, so that the first wavelengths from the two transducers are distinctly different to prevent them from affecting object rotation, but only to levitate the object (in conjunction with a means for levitating in a third direction). The second wavelengths from the transducers are substantially identical, so that their relative phases control rotation of the object. Acoustic energy of the two second wavelengths can be much lower than the first wavelengths that are utilized for levitation. The direction (clockwise or counter clockwise) and rate of rotation are determined by the relative phases and amplitudes of the second wavelengths. In a system with a rectangular enclosure, three transducers are utilized so that each propagates three wavelengths, to control rotation about three axes. Rotation also can be controlled in a cylindrical chamber or in a chamber of rectangular cross section but with open ends.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
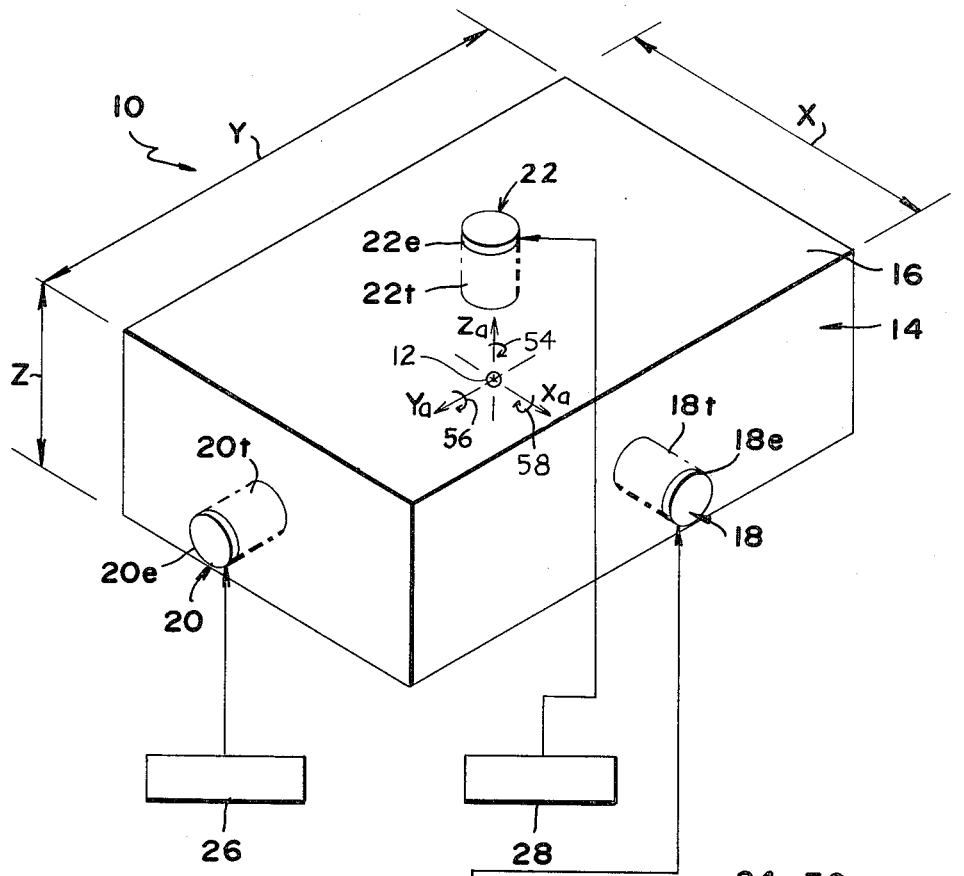
FIG. 1 is a partially perspective view of a levitating and rotation controlling apparatus constructed in accordance with the present invention.

FIG. 1 illustrates a system 10 which can be utilized to acoustically levitate an object such as the sphere shown at 12 and closely control its rotation about any of three axes $X_a$, $Y_a$, and $Z_a$. The three transducers are driven by three drivers 24, 26, and 28, which produce electrical signals that are converted into acoustic waves by the transducers. In this particular application, air or other gas in the chamber is at an elevated temperature while transducer elements 18e, 20e, 22e of the transducers 18–22 must be kept near room temperature. Temperature isolation is achieved by using tubes 18t, 20t and 22t to couple each transducer element to the chamber.

Each of the drivers such as 24 includes three oscillators 30, 32, and 34, to generate three different frequencies that are all combined by a mixer-amplifier 36 that delivers the three frequencies to the transducer 18. The output of the first oscillator 30 is of relatively low frequency and high intensity, and is utilized only to levitate the object 12 (by driving it at a resonant mode of the chamber) as to maintain the object at a predetermined location along the $X_a$ axis. The other two oscillators 32, 34 generate higher resonant mode frequencies, and are utilized only for controlling rotation of the object. The first oscillators 30 of each of the three drivers are all set at considerably different frequencies to prevent interaction between them that could affect rotation of the object. When two or more frequencies (and their corresponding wavelengths) are equal, they are typically referred to as degenerate. The frequency outputs of the other two oscillators 32, 34 of each driver are intended to match certain frequency outputs of other drivers, for the purpose of creating degeneracies that can cause rotation of the object.

Figure 2:
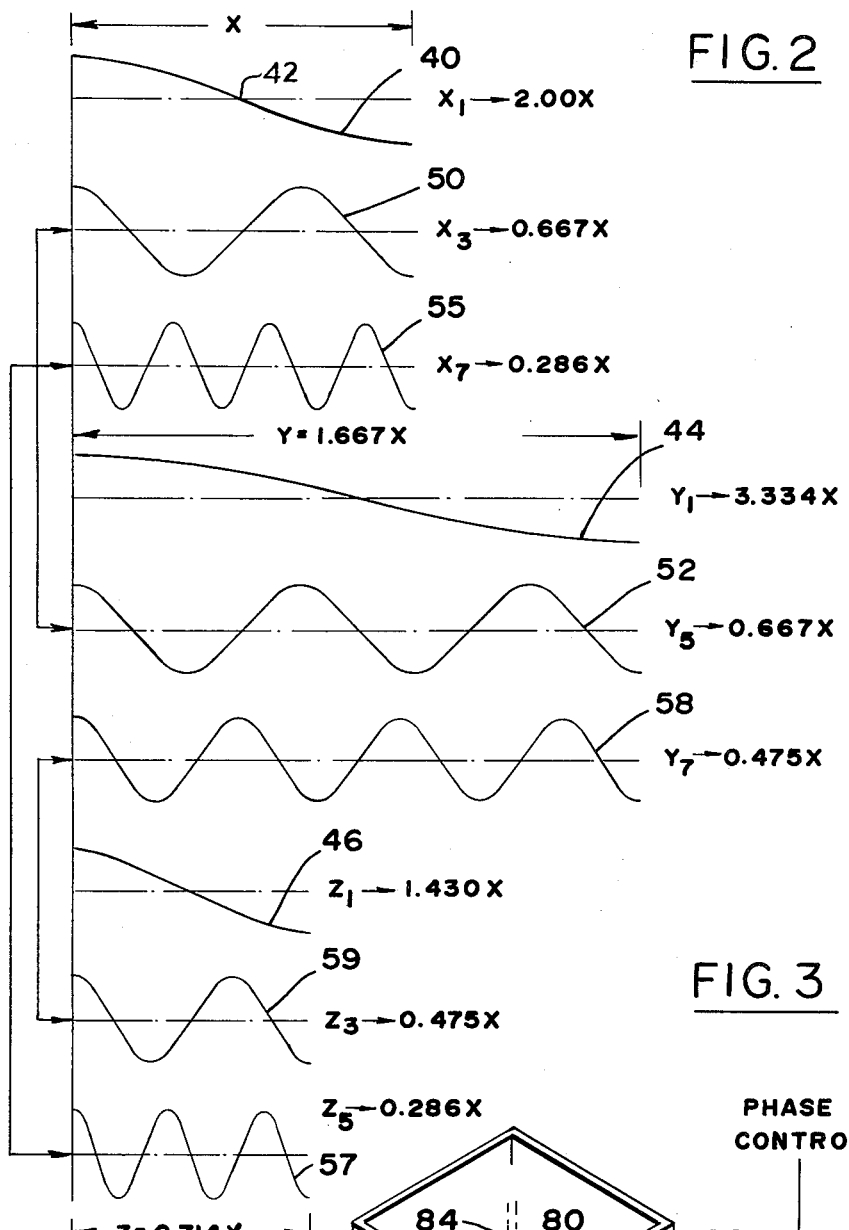
FIG. 2 is a graph showing the nine wavelengths propagates in the chamber of FIG. 1.

In one example, the chamber 16 has a width X along the $X_a$ axis of one unit such as one foot, a length along the $Y_a$ axis of 1.667 times X, or in other words 1.667 feet, and a height along the $Z_a$ axis of 0.714 times X or 0.714 feet. In order to establish a standing wave pattern, all acoustic frequencies in this chamber should be resonant to the corresponding distance across the chamber. FIG. 2 shows the relative lengths of the waves propagated by each of the three transducers 18-22 of FIG. 1. The $X_a$ axis transducer 18 propagates in three resonant modes, including the first or lowest mode $X_1$ whose wavelength shown at 40 is twice the length of the chamber, so that the wavelength is 2.00X. The lowest resonant mode is especially useful for levitation, since it provides a single pressure node at 42 which lies at the center of the chamber. The lowest acoustic mode $Y_1$ along the $Y_a$ axis, shows at 44, has a wavelength of twice the chamber length, which equals 3.334X. The lowest mode $Z_1$ along the height of the chamber has a length which is twice the chamber height, or in other words 1.43X. It can be seen that the three lowest modes $X_1$, $Y_1$ and $Z_1$ are all considerably different, that is, more than a few percent different from one another, to prevent degeneracy that could cause rotation of the object.

The $X_a$ axis transducer 18 also produces a second frequency which corresponds to the third harmonic acoustic mode $X_3$ shown at 50, which has a wavelength of 0.667X. The second excited frequency of the $Y_a$ axis transducer 20 corresponds to the fifth harmonic acoustic mode $Y_5$ which also has a wavelength 52 of 0.667X. Since the $X_3$ and $Y_5$ modes are substantially the same, a degeneracy is produced which leads to rotation of the object if the waves are not in-phase (or 180° out of phase). Such rotation caused by the $X_3$ and $Y_5$ modes, is the rotation about the $Z_a$ axis indicated at 54 in FIG. 1.

The third frequency that the $X_a$ axis transducer 18 produces corresponds to the seventh harmonic mode $X_7$ having a wavelength 55 of 0.286X as shown in FIG. 2. The third frequency excited along the $Z_a$ axis corresponds to the fifth harmonic mode $Z_5$ which also has a wavelength 57 of 0.286X. Thus, there is a degeneracy between the $X_7$ and $Z_5$ modes, resulting in rotation about the $Y_a$ axis as indicated at 56 in FIG. 1. The third excited frequency along the $Y_a$ axis corresponds to the seventh harmonic mode $Y_7$ along the $Z_a$ axis which corresponds to the third harmonic mode $Z_3$ which has a wavelength 59 of 0.475X which is substantially the same as the $Y_7$ wavelength. This produces a degeneracy that can cause rotation about the $X_a$ axis, as indicated at 58 in FIG. 1. It may be noted that a wavelength can be within about one percent of an exact resonant mode and still efficiently produce a standing wave. The permitted deviation depends on the Q of the chamber in that mode. A typical chamber Q for a standing wave may be about 100, which means that the acoustic energy level drops to one-half the maximum attainable (at the exact resonant frequency) when the frequency deviates by one-half percent from the center resonant frequency.

Thus, by utilizing three resonant wavelengths along each of the three axes of the chamber, the object is levitated in a manner that prevents the levitation wavelengths (e.g. $X_1$, $Y_1$, $Z_1$) from causing object rotation while other matched pairs of wavelengths (e.g. $X_3$ and $Y_5$, or $X_7$ and $Z_5$, or $Y_7$ and $Z_3$) along different directions enable control of object rotation about three mutually perpendicular axes of rotation. An arbitrary axis of rotation may be attained by simultaneously exciting the three pairs of degenerate wavelengths at appropriate intensity levels and phase shifts. It may be noted that the apparatus shown in FIG. 1 is useful primarily under a nearly zero gravity environment where transducers of only moderate intensity are used. In outer space environments, where accelerations such as $10^{-3}$ G may be encountered from astronauts moving around, levitation intensities of about 140 to 155 decibels may be utilized. The other frequencies utilized for rotation, may be of a much lower intensity such as 10 decibels lower than for levitation. The amount of torque applied to the object depends upon the phase difference between the two wavelengths that are degenerate, as well as their intensities. Thus, large torques can be produced at relatively moderate intensities of the degenerate modes, by utilizing large phase differences which may approach 90° for maximum torque.

The choice of the dimensions of the chamber 16 is made to enable the use of relatively low modes, with at least one mode along each direction being of different wavelength from modes along the other two directions (for levitation) and three pairs of modes (for rotation about three axes) being of the same wavelength. The particular relative dimensions and modes described in the example above is an especially simple solution to the problem of picking appropriate dimensions which lead to degenerate wavelengths at resonant modes above the fundamental, but other sets of dimensions and corresponding wavelengths can be utilized. Chamber dimensions that enable the use of relatively low modes, preferably below the tenth mode in each direction, avoid the possibility of inadvertently generating several high resonant modes simultaneously. It may be noted that since control of the relative phase difference and/or intensities of the degenerative modes controls the amount and direction of torque rather than speed of rotation, it is often desirable to provide a sensor for indicating object speed of rotation.

The separation of rotation from levitation has several advantages. In a high temperature environment wherein the tubes 18t-22t carry acoustic energy into the chamber, the large temperature gradient along a tube such as 18t makes it difficult to predict the sound velocity in the tube. Accordingly, the phase of the sound, and therefore the relative phases of the resonant modes are hard to predict accurately. By using different and therefore nondegenerate levitation frequencies, their relative phases are of no relevance to rotation. The degenerate frequencies used for rotation can be maintained at a very large phase difference, so small phase variations are of small effect, and rotation is closely controlled by the intensities at these frequencies (or zero intensity to avoid rotation). The precise axis of rotation may be chosen, which may not be aligned with any of the axes $X_{a'}$, $Y_{a'}$, or $Z_{a'}$ by selection of the relative phase differencies and/or intensities of each of the three pairs of wavelengths used for controlling rotation.

Figure 3:
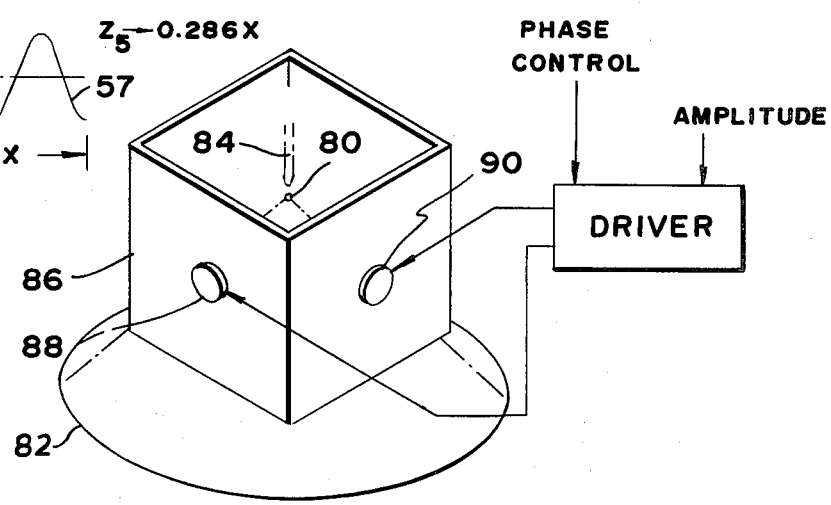
FIG. 3 is a perspective view of a system of another embodiment of the invention.

While the parallelepiped chamber 16 of FIG. 1 provides the most direct calculation of modes needed for levitation and rotation control, other chamber types can also be utilized. FIG. 3 illustrates another embodiment of the invention which is useful to control rotation of an object 80 that is supported by a converging acoustic field generated by a vibrating concave source 82 and reflected by a small reflector 84 slightly above the object, all as described in U.S. patent application Ser. No. 272,837 filed June 12, 1981. A housing 86 forming a chamber with open upper and lower ends, is utilized together with transducers 88, 90 for propagating acoustic waves in horizontal directions which are both perpendicular to the direction of the levitating force produced by the converging acoustic waves. The housing 86 has a rectangular cross section and the transducers 88, 90 are driven at the same resonant frequency (and wavelength), which produces finite air particle velocity components at the position of the object to produce a torque. Here, the only purpose of the transducers is to create rotation of the suspended object.

The separation of the levitating and rotating acoustic modes can be applied to acoustic chambers of non-rectangular geometry. For example, in a long tube of elliptical cross-section, different wavelengths of low resonant modes may be used to levitate an object along the tube axis at a unique position. Higher order modes of the same wavelength may be used to rotate the object. In a similar manner, this method may be applied to a spheroid with radii of different lengths in three orthogonal directions.

It should be noted that in order to rotate an object by acoustic waves of the same wavelength propagated along different directions, the pressure nodes of the two acoustic waves preferably should occur at the same location, and that location should be the location of the levitated object. In the rectangular system of FIG. 1 the acoustic waves are planar, and in that case the position of the pressure nodes is the position where the air particles move at maximum velocity (velocity antinode) to produce optimum rotation. The object location does not have to be at the center of the chamber, since pressure nodes can be created at various other locations.

Figure 4:
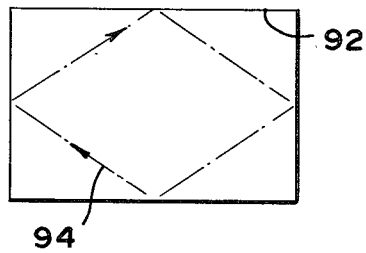
FIG. 4 is a schematic top view of a system of another embodiment of the invention.
Figure 4:
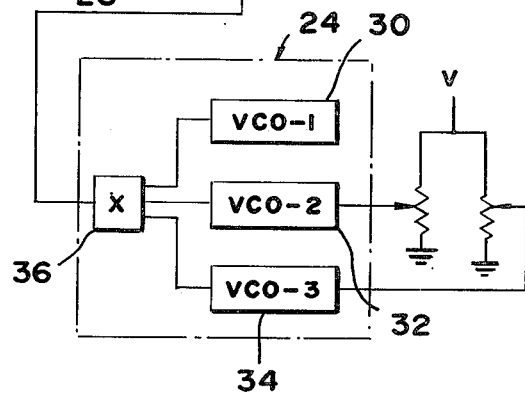

While resonant modes can be generated by acoustic waves travelling normal to the parallel opposite walls of a chamber, it should be understood that other resonant modes can be employed. For example, FIG. 4 shows a chamber 92 of rectangular cross-section, in which an acoustic wave 94 reflects off all four walls at an acute angle, so that the resonant mode depends on two chamber dimensions. The wave could be directed to reflect off all six walls of a chamber of rectangular cross-sections, so the resonant mode would depend on all three dimensions. A similar situation also can be encountered in chambers with curved walls, such as in tubes of elliptical cross-section or spheroidal chambers. It should also be noted that rotating modes do not have to be perpendicular to each other.

Thus, the invention provides a system for controlling rotation of an acoustically levitated object. This is accomplished basically by utilizing non-degenerate acoustic modes for levitating the object to prevent the levitating wavelengths from influencing object rotation, and by utilizing separate degenerate modes which serve to control rotation. Such division of function is especially useful where acoustic transducers (24–28), tubes (18E–22t) and the object to be levitated may be in a non-uniformly heated environment, so that the precise phase relationship between degenerate wavelengths, which may also be used for levitation purposes, may vary independently. In a substantially parallelepiped chamber, three wavelengths can be propagated along each axis of the chamber, with one wavelength along each axis utilized for levitation and distinctly different from all other wavelengths. The other two wavelengths along each direction are chosen to provide pairs of degenerate waves, for controlling rotation along each of the three axes of the chamber.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for levitating and controlling rotation of an object, comprising:
   means for applying acoustic energy along at least two perpendicular directions to a region which includes the object, with the energy along a first direction including energy of first and second wavelengths, and with the energy along the second direction including energy of third and fourth wavelengths, the first and third wavelengths being different, and the second and fourth wavelengths being substantially the same and of lower intensity than the first and third wavelengths.

2. Apparatus for levitating an object and closely controlling its rotation, comprising:
   walls defining a chamber having a width, length and height;
   first transducer means for propagating acoustic waves along the width of said chamber, including waves of a first wavelength and also waves of a second wavelength that is shorter than said first wavelength and with said first and second wavelengths both resonant to the width of the chamber;
   second transducer means for propagating acoustic waves along the length of said chamber, including waves of a third wavelength and also waves of a fourth wavelength that is shorter than said third wavelength and with said third and fourth wavelengths both resonant to the length of the chamber; and
   means for controlling the position of said object along the height of said chamber;
   said chamber width and length and said wavelengths being chosen, so that said first and third wavelengths are different while said second and fourth wavelengths are substantially the same, whereby the first and third wavelength modes levitate the object and the degenerate second and fourth wavelength modes control object rotation.

3. The apparatus described in claim 2 wherein:
   said waves of said first and third wavelengths have a greater intensity than the second and fourth waves.

4. Apparatus for levitating an object and controlling its rotation, comprising:
   walls forming a substantially parallelepiped chamber having a width, length and height;
   means for propagating resonant acoustic waves in said chamber, including waves of three different wavelengths along the width, waves of three different wavelengths along the length, and waves of three different wavelengths along the height;
   a first of the wavelengths along the width, length, and height all being considerably different, so that they do not tend to rotate the object;
   a second of the wavelengths along the width and length being substantially the same to control rotation of the object about a first axis extending along the height;
   a third wavelength along the width and a second wavelength along the height being substantially the same, to control rotation of the object about a second axis extending along the length; and
   a third wavelength along the length and a third wavelength along the height being substantially the same to control rotation of the object about a third axis extending along the width.

5. The apparatus described in claim 4 wherein:
the first wavelength along the height is longer and at a higher intensity than the second and third wavelengths along the height.

6. The apparatus described in claim 4 wherein:
said width, length, and height are dimensions, a second of said dimensions being about 1.67 times a first dimension, and a third dimension being about 0.71 times said first dimension, whereby to enable the use of second and third wavelengths for each dimension for object rotation, which are of low mode numbers.

7. The apparatus described in claim 6 wherein:
said second and third wavelengths of said first dimensions are of the 3rd and 7th modes respectively, so their wavelengths are about 0.67 and 0.29 times the first dimension of the chamber;
the second and third wavelengths of the second dimension are of the 5th and 7th modes, respectively, so their wavelengths are about 0.67 and 0.48 times the first dimension; and
the second and third wavelengths of the third dimension are of the 3rd and 5th modes, respectively, so their wavelengths are about 0.48 and 0.29 times the first dimension.

8. A method for levitating and controlling rotation of an object, comprising:
applying acoustic energy along at least two perpendicular directions to a region which includes the object, with the energy along a first direction including energy of first and second wavelengths, and the energy along the second direction including energy of third and fourth wavelengths;
the first and third wavelengths being different, and the second and fourth wavelengths being substantially the same and of lower intensity than the first and third wavelengths.

9. A method for levitating and controlling rotation of an object, comprising:
applying acoustic energy along two perpendicular directions at first and second wavelengths that are different, to a region which includes the object, to position the object; and
applying acoustic energy along two largely perpendicular directions to said region, at third and fourth wavelengths that are the same but which are each different than said first and second wavelengths, to control rotation of the object, said third and fourth wavelengths being of lower intensity than said first and second wavelengths.

10. Apparatus for levitating an object and closely controlling its rotation, comprising:
walls defining a chamber substantially in the form of a parallelepiped having a width, length and height;
first transducer means for propagating acoustic waves along the width of said chamber, including waves of a first wavelength and also waves of a second wavelength that is shorter than said first wavelength and with said first and second wavelengths both resonant to the width of the chamber;
second transducer means for propagating acoustic waves along the length of said chamber, including waves of a third wavelength and also waves of a fourth wavelength that is shorter than said third wavelength and with said third and fourth wavelengths both resonant to the length of the chamber; and
said chamber width and length and said wavelengths being chosen, so that said first and third wavelengths are different while said second and fourth wavelengths are substantially the same, whereby the first and third wavelength modes levitate the object and the degenerate second and fourth wavelength modes control object rotation;
said first transducer means also producing waves of a fifth wavelength along the chamber width, and including third transducer means for propagating resonant acoustic waves along the height of said chamber, including waves of a sixth wavelength which is different from said first and third wavelengths, and waves of a seventh wavelength that is substantially the same as said fifth wavelength.

11. A method for levitating and controlling rotation of an object, comprising:
applying acoustic energy along three perpendicular directions at the walls of a substantially parallelepiped enclosure which encloses the object;
the energy along each direction including three wavelengths, with a first wavelength along each direction being different from all wavelengths along the other directions, and each of the other two wavelengths along each direction being equal to a wave length in one other direction.

* * * * *